US012792738B2

(12) United States Patent
Winn

(10) Patent No.: US 12,792,738 B2
(45) Date of Patent: Nov. 10, 2026

(54) SYSTEMS, DEVICES, AND METHODS FOR SECURE BOOTING OF RFID SENSORS

(71) Applicant: Automaton, Inc., San Diego, CA (US)

(72) Inventor: David Winn, San Diego, CA (US)

(73) Assignee: Automaton, Inc., San Diego, CA (US)

( * ) Notice: Subject to any disclaimer, the term of this patent is extended or adjusted under 35 U.S.C. 154(b) by 85 days.

(21) Appl. No.: 18/925,384

(22) Filed: Oct. 24, 2024

(65) Prior Publication Data

US 2025/0045409 A1 Feb. 6, 2025

Related U.S. Application Data

(63) Continuation of application No. PCT/US2023/066368, filed on Apr. 28, 2023.

(60) Provisional application No. 63/335,815, filed on Apr. 28, 2022.

(51) Int. Cl.

| | |
|---|---|
| ***G06F 21/57*** | (2013.01) |
| ***H04L 9/06*** | (2006.01) |
| ***H04L 9/32*** | (2006.01) |

(52) U.S. Cl.

CPC .......... *G06F 21/575* (2013.01); *H04L 9/0631* (2013.01); *H04L 9/3249* (2013.01); *H04L 9/3263* (2013.01); *H04L 9/3278* (2013.01)

(58) Field of Classification Search

CPC ...... G06F 21/575; G06F 21/44; G06F 9/4401; H04L 9/0631; H04L 9/3249; H04L 9/3263; H04L 9/3278; H04L 9/14; H04L 9/3268; H04L 2209/805

See application file for complete search history.

(56) References Cited

U.S. PATENT DOCUMENTS

| | | | | |
|---|---|---|---|---|
| 10,013,860 | B2 | 7/2018 | Hewett | |
| 10,386,474 | B2 | 8/2019 | Hewett | |
| 10,686,592 | B1 * | 6/2020 | Aghdam | .................. H04L 9/08 |
| 10,871,558 | B2 | 12/2020 | Hewett | |

(Continued)

FOREIGN PATENT DOCUMENTS

| | | | |
|---|---|---|---|
| WO | 2023212698 | A1 | 11/2023 |
| WO | 2023240088 | A2 | 12/2023 |

(Continued)

OTHER PUBLICATIONS

International Search Report and Written Opinion in International Appl No. PCT/US2023/066368 mailed Jul. 17, 2023, 13 pages.

*Primary Examiner* — Tracy A Warren

(74) *Attorney, Agent, or Firm* — Smith Baluch LLP

(57) ABSTRACT

Radio-frequency identification (RFID) tag readers or sensors interrogate and locate RFID tags in stores, warehouses, and other environments. Unfortunately, these sensors are vulnerable to intrusions, including attacks that can expose any computer network to which the sensors are coupled. Attacks like these can be prevented using a secure booting process for distributing and loading an operating system and/or other software onto each sensor. When the sensor first boots up, it validates a pair of locally stored binary files, e.g., using a pair of locally stored digital keys. Once booted, it establishes a secure connection to a controller, then downloads, validates, and executes a binary file from the controller. Executing the binary file from the controller loads an operating system kernel into the sensor's memory for secure operation.

16 Claims, 4 Drawing Sheets

(56) References Cited

U.S. PATENT DOCUMENTS

| | | | | |
|---|---|---|---|---|
| 11,043,093 | B2 | 6/2021 | Hewett | |
| 11,215,691 | B2 | 1/2022 | Hewett et al. | |
| 11,408,965 | B2 | 8/2022 | Hewett et al. | |
| 11,543,512 | B2 | 1/2023 | Hewett | |
| 11,915,567 | B2 | 2/2024 | Hewett | |
| 11,933,877 | B2 | 3/2024 | Hewett | |
| 12,013,474 | B2 | 6/2024 | Hewett et al. | |
| 12,117,548 | B2 | 10/2024 | Hewett et al. | |
| 12,164,048 | B2 | 12/2024 | Hewett et al. | |
| 2012/0210115 | A1* | 8/2012 | Park | H04L 9/3247 713/2 |
| 2018/0234519 | A1 | 8/2018 | Boyapalle et al. | |
| 2020/0052912 | A1* | 2/2020 | Lu | H04L 9/30 |
| 2020/0220736 | A1* | 7/2020 | Subramanian | H04L 9/3252 |
| 2020/0228351 | A1* | 7/2020 | Kreft | H04L 9/3247 |
| 2022/0006653 | A1* | 1/2022 | Ghetie | G06F 21/575 |
| 2023/0252154 | A1* | 8/2023 | De Santis | G06F 9/4401 713/2 |
| 2024/0046211 | A1 | 2/2024 | Hewett et al. | |
| 2024/0193381 | A1 | 6/2024 | Brown, III et al. | |
| 2024/0273986 | A1 | 8/2024 | Hewett | |
| 2024/0295623 | A1 | 9/2024 | Hewett et al. | |
| 2024/0302522 | A1 | 9/2024 | Hewett | |
| 2024/0330614 | A1 | 10/2024 | Mueller et al. | |
| 2024/0330619 | A1 | 10/2024 | Morse et al. | |
| 2024/0386375 | A1 | 11/2024 | Dhar et al. | |

FOREIGN PATENT DOCUMENTS

| | | | |
|---|---|---|---|
| WO | 2023240296 | A1 | 12/2023 |
| WO | 2023250401 | A1 | 12/2023 |
| WO | 2024196837 | A1 | 9/2024 |

* cited by examiner

SYSTEMS, DEVICES, AND METHODS FOR SECURE BOOTING OF RFID SENSORS

CROSS-REFERENCE TO RELATED APPLICATION(S)

This application is a bypass continuation of International Application No. PCT/US2023/066368, filed Apr. 28, 2023, which claims the priority benefit, under 35 U.S.C. 119(e), of U.S. Application No. 63/335,815, filed Apr. 28, 2022. Each of these applications is incorporated herein by reference in its entirety for all purposes.

BACKGROUND

Radio-frequency identification (RFID) tags, or tags, are low-cost devices that can be attached to objects and offer the promise of automated tracking, locating, sales check-out, and inventory of the objects among other commercial and medical applications. There are passive, semi-active, and active types of RFID tags that can be wirelessly interrogated by an RFID tag reader, also called a reader, RFID sensor, or sensor, and emit wireless radio-frequency (RF) replies to the reader. Each reply can include information stored in the RFID tag, such as an electronic product code (EPC), tag identification number, or other alpha-numeric sequence. Other information may be included with the reply. Each EPC is unique and so can be used to identify the tag that sent a particular reply.

Passive RFID tags have no battery and are therefore typically less expensive than semi-active and active RFID tags. A passive RFID tag is powered by an unmodulated, continuous-wave (cw) RF signal from the RFID tag reader. This cw RF signal powers up the passive RFID tag's circuitry and precedes a query or command from the RFID tag reader in the form of a modulated RF signal. The passive RFID tag receives and demodulates the modulated RF signal and responds to the RFID tag reader by modulating and backscattering a portion of the modulated RF signal. This modulated, backscattered RF signal is the passive RFID tag's reply and is at the same carrier frequency as the RF signal from the RFID tag reader. The reply from a passive RFID tag is detected by the RFID tag reader and is typically many orders of magnitude weaker than the RF signal from the RFID tag reader.

RFID tag readers or sensors are typically deployed with and connected to a central controller, also called a controller, appliance, or remote controller device, that stores and processes information encoded in and/or derived from the replies detected by the RFID tag readers. In a retail store, for example, RFID sensors can be suspended from the ceiling and connected to one or more controllers for reading RFID tags affixed to retail items in the retail store, with each controller connected to and (potentially exclusively) controlling a particular RFID tag reader or group of RFID tag readers. For example, a controller may estimate the locations of the RFID tags based on the amplitudes and/or angles of arrival of the replies detected by the RFID tag readers. The controller can also track the retail store's inventory based on which tags respond to queries or other signals from the RFID tag readers and trigger operations in response to changes in tag inventory or tag location.

SUMMARY

A challenge with systems of RFID tag readers or sensors and controllers or appliances is that malicious entities may communicate with the RFID tag readers to maliciously interfere with the software running on such sensors such as to, for example, reprogram the sensors so as to in turn read and modify the information in the RFID tag(s). Another challenge is that the malicious entity can also attempt to reverse engineer the software executing on the RFID sensor. This software can then be executed on a malicious RFID sensor so as to gain access to the store's controller-sensor-tag ecosystem. There is hence an unmet need to prevent such access, readability, and manipulation of software on RFID sensors. There are also unmet needs for secure boot control of RFID sensors by controllers and for secure communications between RFID sensors and their controllers.

Accordingly, disclosed herein are methods of securely booting an RFID sensor via a controller, appliance, or other remote controller device. An example method includes executing a first binary file stored in a memory of the RFID sensor to search for a second binary file stored in a peripheral component of the RFID sensor. The peripheral component can be a quad serial peripheral interface (QSPI). The method further includes determining whether the second binary file is valid by verifying a digital signature of the second binary file based on a first digital key stored on the RFID sensor, and/or by decrypting the second binary file based on a second digital key stored on the RFID sensor. The first digital key and second digital key can be stored on an electronic fuse of the RFID sensor. The second digital key can include a physical unclonable function (PUF) key. In some cases, the first digital key is an Rivest-Shamir-Adleman (RSA) key, and wherein the second digital key is an Advanced Encryption Standard (AES) key.

The method also includes, in response to determining that the second binary file is valid, executing a bootloader of the second binary file to request, from the controller device, a third binary file. The method further includes receiving, from the controller device, the third binary file in response to the request. The method also includes determining whether the third binary file is valid by verifying a digital signature of the third binary file, and/or by decrypting the third binary file. The method also includes, in response to determining that the third binary file is valid, executing the third binary file to load a kernel of an operating system of the RFID sensor into the memory of the RFID sensor. In some cases, the third binary file can include an updated version of the second binary file, and the method can further include replacing the second binary file stored in the RFID sensor with the updated version of the second binary file.

The method can also include transmitting, from the RFID sensor to the controller, a request to authenticate the RFID sensor for subsequent communications between the RFID sensor and the controller. The method can further include transmitting, from the RFID sensor to the controller, a first Secure Sockets Layer (SSL) certificate, and receiving, at the RFID sensor from the controller, a second SSL certificate. The method can also include in response to the RFID sensor determining that the first SSL certificate is authentic and the controller determining that the second SSL certificate is authentic, establishing a secure communication channel between the RFID sensor and the controller. The secure communication channel is a ZeroMQ (ZMQ) pipe between TCP/IP sockets of the RFID sensor and the controller.

An inventive RFID sensor can include a memory, a peripheral component (e.g., a quad serial peripheral interface (QSPI)), and a processor operably coupled to the memory and to the peripheral component. In operation, the memory stores a first binary file and the peripheral component stores a second binary file and communicates with a controller or appliance. The processor executes the first binary file, searches for the second binary file in the course of executing the first binary file, validates the second binary file, and requests a third binary file from the controller in response to successfully validating the second binary file. The processor also validates the third binary file, executes the third binary file in response to successfully validating the third binary file, and loads an operating system of the RFID sensor into the memory of the RFID sensor in the course of executing the third binary file.

The processor can validate the second binary file by verifying a digital signature of the second binary file based on a first digital key stored on the RFID sensor and/or decrypting the second binary file based on a second digital key stored on the RFID sensor. The first digital key can be an Rivest-Shamir-Adleman (RSA) key and the second digital key ca be an Advanced Encryption Standard (AES) key. Alternatively, the second digital key can include a physical unclonable function (PUF) key. The RFID sensor can also include an electronic fuse, operably coupled to the processor, that stores the first digital key and second digital key.

The processor can validate the third binary file by verifying a digital signature of the third binary file and/or decrypting the third binary file. The third binary file can include an updated version of the second binary file, in which case the processor can replace the second binary file stored in the peripheral component with the updated version of the second binary file.

The processor can also transmit, to the controller, a request to authenticate the RFID sensor for subsequent communications between the RFID sensor and the controller and a first Secure Sockets Layer (SSL) certificate. The processor can receive a second SSL certificate from the controller and determine that the second SSL certificate is authentic. If the second SSL certificate is authentic and the controller determines that the first SSL certificate is authentic, the processor can establish a secure communication channel between the RFID sensor and the controller. This secure communication channel can be a ZeroMQ (ZMQ) pipe between Transmission Control Protocol/Internet Protocol (TCP/IP) sockets of the RFID sensor and the controller.

All combinations of the foregoing concepts and additional concepts are discussed in greater detail below (provided such concepts are not mutually inconsistent) and are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
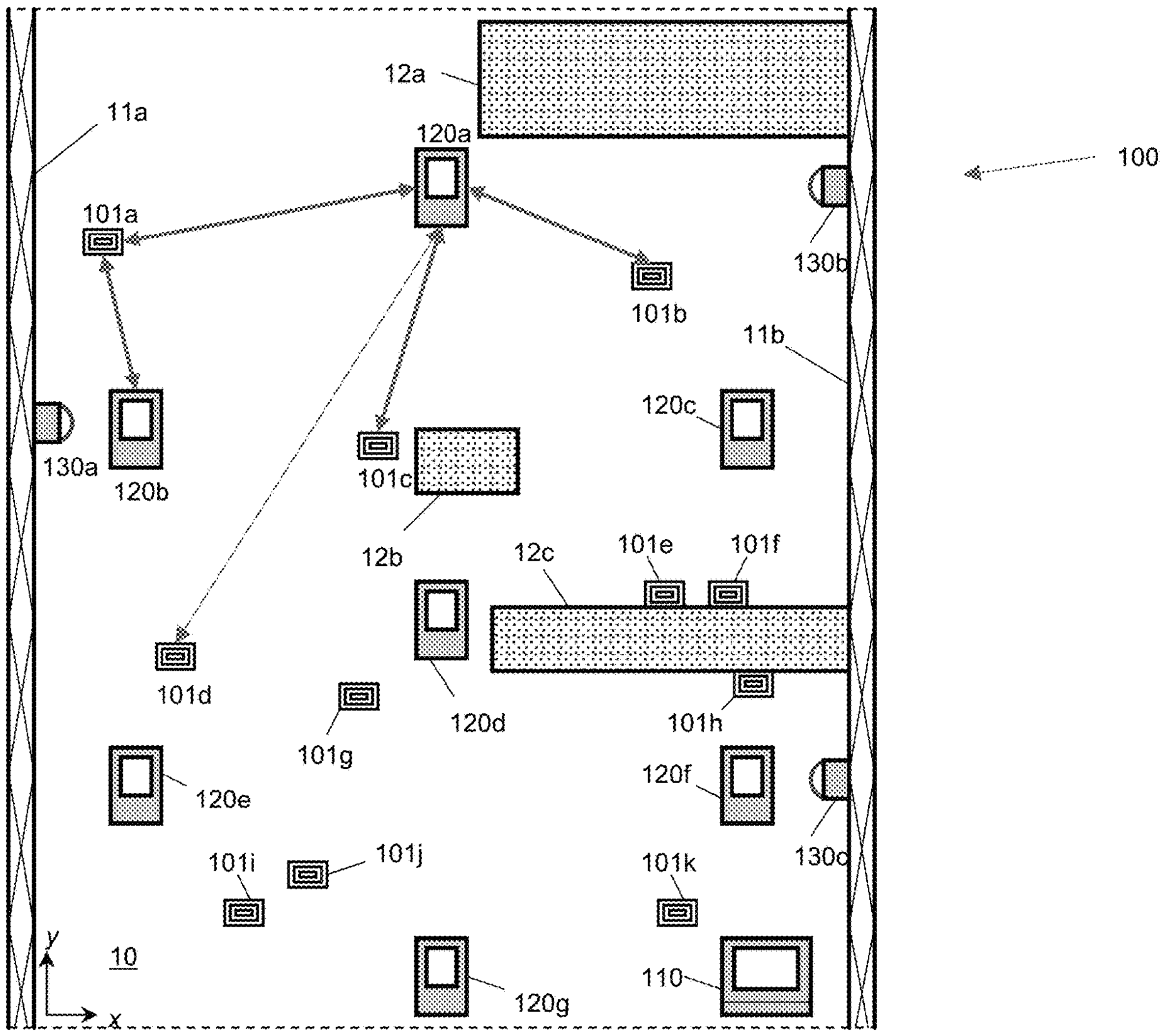
FIG. 1A illustrates an example RFID system for interrogating and/or locating RFID tags with securely booting RFID sensors.

The technology disclosed herein address problems associated with guaranteeing the origin of the software used to operate RFID tag readers (also called readers, RFID sensors, or sensors) and with hiding that software from other parties, e.g., to prevent theft or undesired exposure or copying. This prevents unauthorized parties from reprogramming or reverse engineering the sensors and controllers. It also prevents attacks on the computer networks that host the controller and sensors and via the sensors.

The inventive technology can be implemented with a sensor that includes a field-programmable gate array (FPGA) with read-only memory (ROM) that stores code for verifying signatures of Flattened uImage Tree (FIT) images for booting the sensor. The sensor can also include a peripheral component, such as a Quad Serial Parallel Interface (QSPI), that stores a boot image or other binary file (e.g., a boot.bin file) with low-level boat loaders (e.g., U-Boot) for booting up the sensor. Once booted, the FPGA's boot loader downloads the FIT image from the controller, then validates the signature for the FIT image and decrypts the FIT image. Executing the decrypted FIT image from the controller loads the kernel of the operating system into the sensor's memory. Security features provided with the boat loader logic secure the network boot stage.

The inventive technology also provides end-to-end encryption for setting up a secure tunnel or channel between a sensor and a controller. Generally, the sensors use a deployed certificate authority tree to authenticate and validate themselves. The controller has a similar certificate. To set up a secure tunnel, a sensor sends an authentication request (without time checks) to the corresponding controller. The sensor and controller exchange and validate each other's certificates. If and only if both certificates are valid, then the sensor and controller establish a connection using a standard Secure Sockets Layer (SSL) client/server handshake. Unlike other processes for setting up a secure tunnel, this process (1) is carried out for and by a sensor and a controller; (2) does not use or rely on hostnames because the sensor and controller are on a small network; and (3) does not involve checking times because not the certificates stay valid for at least as long as the sensor and controller are expected to be deployed (that is, the certificates should not be revoked).

Once the SSL client/server handshake is complete, the sensor asks the controller for instructions and receives keys for encrypting data from the controller via the secure tunnel, which is an ethernet/IP/TCP connection. Inside the TCP stream, the sensor and controller use a messaging protocol with addressing. The messages are encrypted using the Advanced Encryption Standard with Galois/Counter Mode (AESGCM) of operation. This obscures and authenticates messages. The messages also have sequence numbers and are decoded at the ends of the secure tunnel with flat buffers. This secure tunnel uses few processor resources, enabling the sensor and controller to run AESGCM accelerators. The stack is also very efficient to read and write and so can pass messages very quickly, even on embedded sensors. The secure tunnel provides secure, high-speed communications, enabling the sensor and controller to trade hundreds to thousands of messages per device per second with a latency on the order of 10 ms. For a system that generates 5-10 messages per sensor per RFID tag interrogation sequence (hop), with 20+ to 100+ sensors per controller, lower latency gives better control, e.g., the controller can direct the connected sensor(s) to re-run hops immediately, make decisions more quickly, plan next hop, etc.

Example Sensors and Controllers for Interrogating and Locating RFID Tags

Figure 1B:
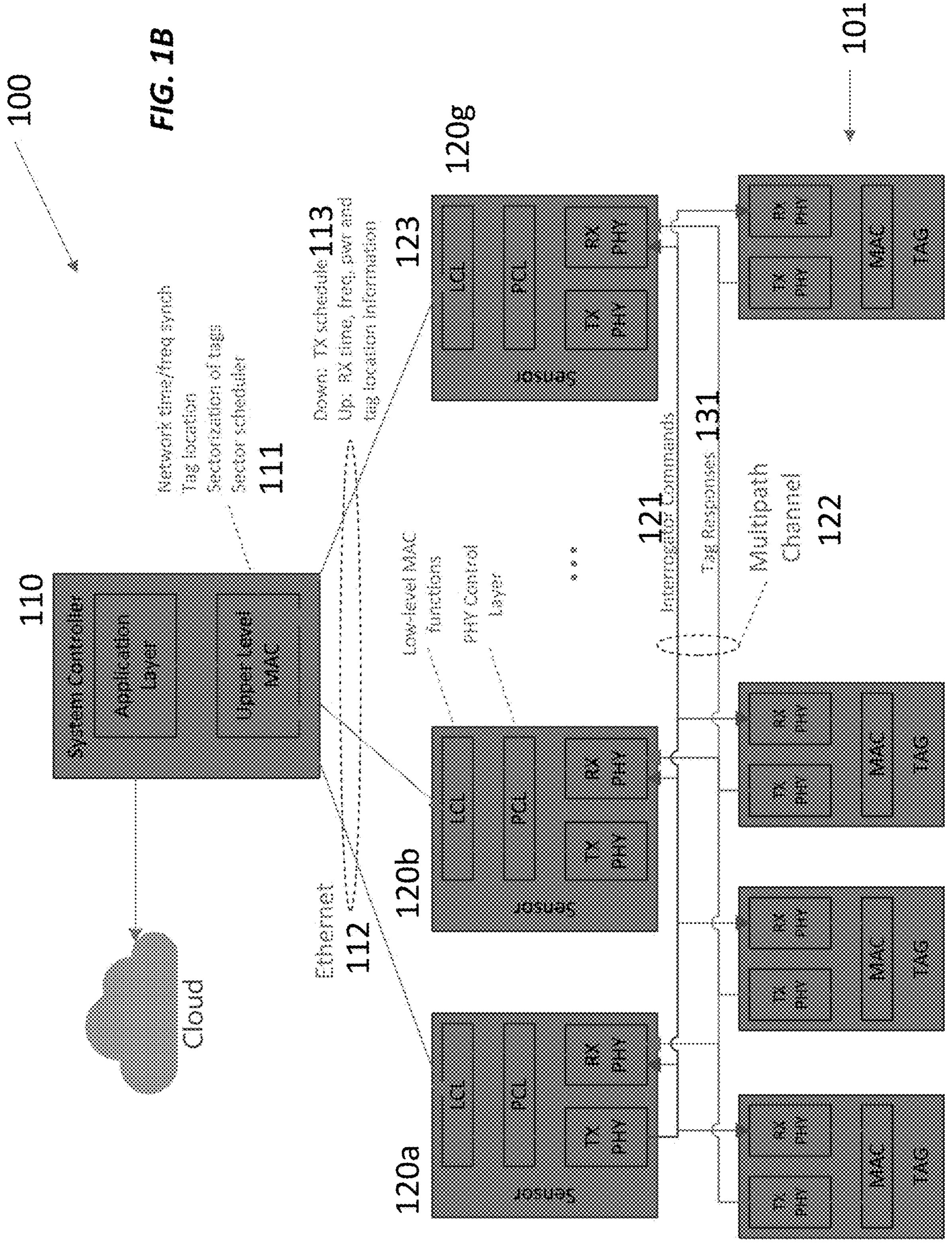
FIG. 1B illustrates connections among and components of the RFID sensors and controller in the RFID system of FIG. 1A.

FIGS. 1A and 1B depicts an RFID system 100, or simply system 100, that interrogates and locates passive RFID tags 101*a*-101*k* (collectively, RFID tags 101), or tags, in an environment 10, such as a retail store or warehouse, with secure booting technology to prevent unauthorized access. The RFID tag location system 100 includes RFID tag readers 120*a*-120*g* (collectively, RFID tag readers 120), also called readers, RFID sensors, or sensors, that transmit interrogation signals to the tags 101 and detect replies from the tags 101; a central controller or appliance 110 that is coupled to the sensors 120 (e.g., via wireless or wired connections) and that determines channel estimates based on the replies and uses them to estimate the locations of other tags; and optional cameras 130*a*-130*c* (collectively, cameras 130) that can be used to confirm the tags' locations, e.g., for mapping tags, people, or objects to particular locations in the environment 10. The RFID tags 101 are attached to objects (not shown) in the environment 10. These objects may be items for sale, such as articles of clothing; fixtures or furnishings 12*a*-12*c* (collectively, fixtures 12), such as tables, shelves, walls, or doors; or people, such as employees, customers, or other visitors. The environment 10 can be bounded by walls 11*a* and 11*b*, a ceiling, and a floor, any of which can reflect or scatter RF signals from the RFID tag readers 120 and/or RFID tags 101.

The furnishings 12 and other objects can block, attenuate, and/or scatter RF signals transmitted by the RFID tag readers 120 and the passive RFID tags 101. These furnishings 12 can include shelves, racks, cabinets, etc. that may be used to hold the objects to which at least some of the RFID tags 101 are attached. (There may also be RFID tags 101 on at least some of these furnishings 120, for example, reference RFID tags 101 whose locations are known and can be used to locate RFID tags 101 at unknown locations.) For example, some furnishings 12 may comprise metal shelving that holds one or more items for sale (not shown in FIG. 1) that are tagged with the RFID tags 101. The furnishings 12 can be arranged in rows in some settings, with aisles separating the rows to allow access to all objects tagged with RFID tags 101.

The RFID tag readers 120 are preferably installed in the RFID environment 10 such that every RFID tag 101 in the environment can communicate with at least one of the RFID tag readers 120. In a typical installation, the RFID tag readers 120 are mounted to or suspended from the ceiling. If the ceiling is a drop ceiling or secondary ceiling, the RFID tag readers 120 can be hung from the ceiling panels, mounted to the ceiling panels, or placed between the ceiling panels and the structural ceiling as disclosed in International Application No. PCT/US2022/081761, entitled "Antenna Arrays and Signal Processing for RFID Tag Readers" and filed on Dec. 16, 2022. In addition, or instead, one or more of the RFID tag readers 120 can be mounted to the walls 11*a* or 11*b* or fixed furnishings 12.

The cameras 130 capture images of at least portions of the environment 10 and of people and things within the environment 10. The cameras 130 are communicatively coupled to the appliance 110, which receives and processes images from the cameras 130 and tag reply data from the RFID tag readers 120. If desired, the appliance 110 can use the images from the cameras 130 and the data from the RFID tag readers 120 to locate the RFID tags 101 and associate them with people and/or objects in the environment. The appliance 110 can also determine a route from a person's location to a particular RFID tag 101/object, for example, if the person is looking for the object or the object should be moved from its current location. The appliance 110 can recognize the person from the image or from an RFID tag 101, smartphone, or other wireless device carried by the person and can trigger a sale of the object or other inventory change based on the person's movements with the object.

The RFID tag readers 120 may communicate with each other and/or with the appliance 110 via wireless or wired (e.g., Ethernet) connections. The appliance 110 may be a specialized computing device or a suitably programmed computer, laptop, or smart phone adapted to communicate with the RFID tag readers 120 and issue commands recognizable to the RFID tag readers 120. The appliance 110 can also receive signals from the RFID tag readers 120. For example, the appliance 110 can command the RFID tag readers 120 to inventory all RFID tags 101 (and attached items) in the environment 10 or to determine the location of one or more RFID tags 101 (and attached item(s)) in the environment 10. The appliance 110 can also command the RFID tag readers 120 to query the RFID tags 101 according to a schedule, e.g., as described in International Application No. PCT/US2022/026198, entitled "RFID Tag Readers Switchable between Interrogator and Listener Modes," which is incorporated herein by reference in its entirety for all purposes. The RFID tag readers 120 can send raw or processed data representing the RFID tags' replies to the appliance 110, which uses this data to identify and/or locate the RFID tags 101 and/or attached objects as described below.

Each RFID tag reader 120 includes an antenna array, such as a four-element square antenna array, that transmits signals to the RFID tags 101 and receives replies from the RFID tags 101. The RFID tag readers 120 switch or hop the signals among different frequency channels (carrier frequencies), e.g., within bands of 865-868 MHz (Europe) or 902-928 MHz (North America). They can also use their antenna arrays to steer the transmitted signals and/or receptivity patterns to different angles of arrival (AOAs). The RFID tag readers 120 detect replies from the RFID tags 101 with their antenna arrays too.

The appliance 110 can store and process the replies and/or information encoded in and/or derived from the replies. For instance, the RFID tag readers 120 may forward EPCs encoded in the tag replies and information about the tag replies, such as amplitude, angle of arrival, carrier frequency, antenna beam-forming sector, etc. to the appliance 110. The appliance 110 can use this information to estimate the corresponding tag's location and to trigger actions based on the estimated location. For instance, if the appliance 110 determines that the tag 101 is at the checkout or is leaving the store, it may trigger a sale and restocking of the object to which the tag 101 is affixed.

Each reader 120 in FIG. 1A can be switched between an interrogator mode in which the reader 120 transmits interrogation signals and receives tag responses to those interrogation signals and a listener or receive-only mode in which the reader 120 receives both interrogation signals from other readers 120 and tag responses to those other interrogation signals but does not transmit interrogation signals. Typically, only one reader 120 is in interrogator mode at a time while the other readers 120 are in listener mode. The reader 120 that is in interrogator mode interrogates a tag 130, and it and the readers 120 in listener mode within range receive the tag's reply. For N readers 120, this means making up to N measurements of the tag's reply simultaneously even though only one reader 120 may be transmitting an interrogation message at a time. This N-fold increase in the number of simultaneous measurements can be used to increase the speed (e.g., by a factor of N), fidelity (e.g., by a factor of VN through incoherent averaging), or speed and fidelity of the RFID tag location performed by the system 100. The readers 120 may make more simultaneous measurements in a round-robin fashion, with each reader 120 serving as the interrogator in turn while the other readers 120 act as listeners, further increasing measurement speed and/or fidelity. Because the listeners are not powering the tags, and hence do not suffer from self-interference, etc., they can detect tag responses at much greater ranges, making it possible to make measurements from distances/locations that are simply not possible with conventional systems. For more details about interrogator and listener modes, please see International Application No. PCT/US2022/026198, which is incorporated herein by reference in its entirety for all purposes.

FIG. 1B shows a logical view of the connections among the RFID tags 101, RFID sensors 120, and controller 110 in the RFID system 100. The sensors 120 are connected to the system controller 110 via respective Ethernet connections 112 or other suitable (usually wired) connections as shown in FIG. 1B. For convenience, these Ethernet connections 112 may be Power-over-Ethernet (POE) connections that provide both electrical power and network connectivity to the sensors 120. The Ethernet connections 112 may connect the sensors 120 to each other as well. The controller 110 has a clock synchronized to network time and can use that clock to synchronize the sensors 120 via the Ethernet connections 112 during operation. The sensors 120 can also communicate with each other wirelessly (e.g., over the same RF channel used for communicating with the tags 101) using reader-specific commands instead of via the local area network provided by the Ethernet connections 112.

The system controller 110 includes a processor that can generate a schedule 113 for interrogating the RFID tags 130. The schedule lists the time(s) at which each reader 120 is supposed to be in interrogator mode and in listener mode. That is, the schedule 113 lists when each reader 120 is supposed to emit interrogation signals 121, including queries and other interrogator commands. The schedule 113 may also list windows when each reader 120 should expect to receive interrogation signals 121 from other readers 120 and tag replies prompted by those interrogation signals 121. The system controller 110 transmits this schedule 113 to the RFID tag readers 120 via the Ethernet connections 112. It stores the schedule 113 in a local memory coupled to the processor. The system controller 110 receives tag reply data 123, including receive time, frequency, power, and tag location information, from the RFID tag readers 120 and stores this data 123 in the memory for later processing.

The readers 120 broadcast interrogation signals 121 according to the schedule 113, with each reader 120 in either interrogator mode or listener mode. Again, one reader 120 is in interrogator mode at a time, with the other readers 120 in listener mode. When the reader 120 in interrogator mode broadcasts the interrogation signal 121, the tags 130 receive the interrogation signal 121 via wireless, multipath channels 122 through the store, warehouse, factory, or other environment in which the system 100 is deployed. At least one of the tags 130 responds to the interrogation signal 121 with a tag reply 131 that arrives at the reader 120 in interrogation mode within a predefined time window after the interrogation signal 121. The readers 120 in listener mode detect the interrogation signal 121 and tag reply 131 over other wireless, multipath channels. The tag reply 131 as detected by the different readers 120 can be used to locate the tag 130 faster and/or more precisely than is possible with conventional RFID tag location systems.

Aspects of the system 100 can be generally operational as described in International Application No. PCT/US2022/026198, entitled "RFID Tag Readers Switchable between Interrogator and Listener Modes" and filed Apr. 25, 2022; International Application No. PCT/US2022/035646, entitled "Self-Interference Cancellation for RFID Tag Readers" and filed Jun. 30, 2022; and/or International Application No. PCT/US2022/081761, entitled "Antenna Arrays and Signal Processing for RFID Tag Readers" and filed Dec. 16, 2022, the entire disclosure of each of which is incorporated herein by reference.

Figure 2A:
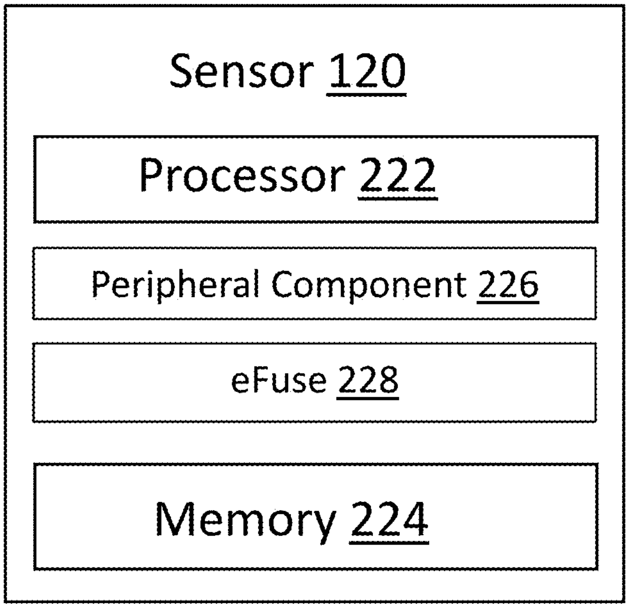
FIG. 2A illustrates example components of the RFID sensors in FIGS. 1A and 1B.

FIG. 2A illustrates components in one of the sensors 120 in FIGS. 1A and 1B. These components include at least a processor 222 and a memory/database 224 that are communicably coupled with each other, e.g., via a bus or other suitable interface (not shown). The sensor 120 may also include other components, including a power supply or power conditioning circuitry, as well as an antenna array, analog front end for generating and receiving signals via the antenna array, and analog-to-digital and digital-to-analog converters for converting signals between the analog and digital domains.

Figure 2B:
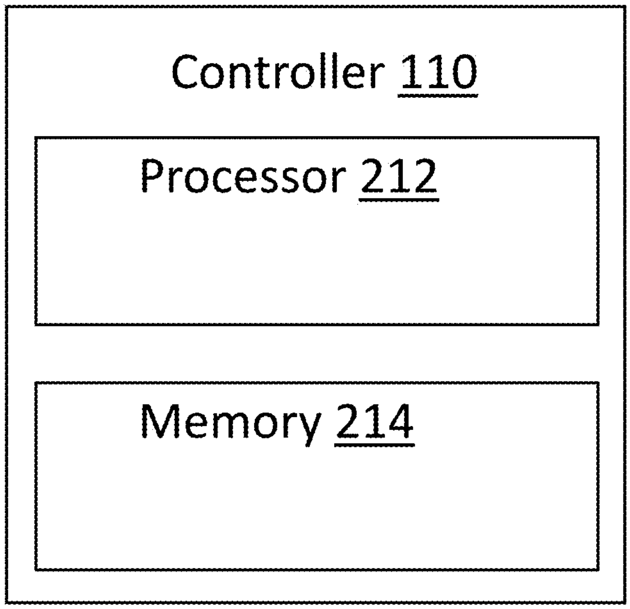
FIG. 2B illustrates example components of the controller in FIGS. 1A and 1B.

Similarly, FIG. 2B illustrates components of the controller 110, which includes at least a processor 212 and a memory/database 214. Like the sensor 120, the controller 110 can include additional electronic components and/or circuitry for electrical power. The controller 110 also includes interfaces, such as Ethernet interfaces and/or WiFi transceivers, for communicating with the sensors 120 and/or with other networked components, including other controllers. These interfaces may enable the controller 110 to provide electrical power to the sensors 120.

The memories/databases 224 and 214 in the sensor 120 and controller 110, respectively, can each encompass, for example, one or more of a random-access memory (RAM), memory buffer, hard drive, database, read-only memory (ROM), programmable read-only memory (PROM), erasable programmable read-only memory (EPROM), electrically erasable read-only memory (EEPROM), Flash memory, and/or so forth. The memory/database can store instructions to cause its corresponding processor to execute processes and/or functions of its corresponding sensor/controller.

Each processor can be any suitable processing device configured to run and/or execute a set of instructions or code associated with the sensor/controller. The processor can be, for example, a general purpose processor, a Field Programmable Gate Array (FPGA), an Application Specific Integrated Circuit (ASIC), a Digital Signal Processor (DSP), and/or the like.

Example Operation

With reference to the sensor 120, the processor 222 includes or encompasses an FPGA, and the memory 224 can include or encompass a PROM. The PROM can include one or more security features (e.g., a security bit that that can be set and/or otherwise manipulated) to prevent the FPGA from being read or copied, such as via JTAG (Joint Test Action Group)-based boundary scanning for example. Further, the PROM can include one or more security features/bits to write-protect or lock the PROM, which can prevent inadvertent or deliberate writing to the PROM, such as via JTAG for example.

The sensor 120 can further include a peripheral component 226 and an electronic fuse (eFuse) 228 communicably/operably coupled to the processor 222 and/or the memory 224, e.g., via a bus or other suitable interface. In some cases, two or more of the processor 222, the memory 224, the peripheral component 226, and the eFuse 228 can be disposed/formed on the same circuit board, while in other cases, each is disposed/formed on a separate circuit board. For example, in some cases, a single circuit board (e.g., the XCZU6EG and/or XCZU7EG FPGA offered by Xilinx Inc.) can include an FPGA-architecture based layout that includes the eFuse 228, the processor 222, other components of the FPGA fabric, and/or the like.

The peripheral component 226 can be configured for communicating with the processor 212 of the controller 110, such as via a serial peripheral interface (SPI), which generally includes two data lines. In some cases, the peripheral component 226 can include a quad serial peripheral interface (QSPI), which generally includes four bidirectional data lines; said another way, each data line of the QSPI can output information to the controller 110 or to receive information from the controller 110. The QSPI can also be used to store additional code such as, for example, one or more image files as further described below. Other than using a QSPI, more generally, any suitable storage method can be employed that can store such image files in memory that is disposed on the same circuit board as the processor 222.

The sensor 120 can be securely booted (e.g., by the controller 110) as follows. The PROM portion of the memory 224 can store a first binary file, e.g., a bootstrap program, executable by the processor 222 that is executed at power up/upon application of power. The bootstrap program can search, on the storage of the QSPI 226, for a second binary file, e.g., a binary disk image file (also sometimes referred to as a boot.bin binary file) that can be employed to boot the sensor 120. In some cases, the boot.bin binary file can be encrypted such as, for example, using the advanced encrypting standard (AES).

In order to decrypt boot.bin, the eFuse 228, which can generally be characterized as integrated circuits that integrate control circuits and power switches, can further be configured to store an AES key (e.g., include one or more registers usable for storing the AES key, which can be a 256-bit key) that is usable by the processor 222 for decrypting the boot.bin file. In this manner, the sensor 120, when manufactured, can have the correct AES key written to the eFuse for decrypting boot.bin files, where only those boot.bin files with matching AES encryption will be readable and used for further booting. In this manner, since electronic fuses can be written to once, they cannot be changed after their initial programming. In some cases, the electronic fuse storing the AES key is also not readable, so while it can be used to decrypt the boot.bin files, it cannot be read back and copied other than by the processor 222. In some cases, the AES key can be further covered with a PUF (a physical unclonable function) key. The PUF key can generally be characterized as one derived from the physical characteristics of the FPGA, and is unique to each FPGA that is produced. The PUF key cannot be read out other than by the processor 222, but can be used to encrypt and decrypt data. In this manner, the AES key cannot be copied or cloned to another (e.g., malicious) device once stored to the eFuse 228 of the sensor 120.

In some cases, the boot.bin file on the QSPI 226 can be digitally signed such as, for example, by an RSA private key. The eFuse 228 can further be configured to store a public RSA key, and the processor 222 can be further configured to verify that the digital signature of the boot.bin file matches the stored public RSA key. The inventors have understood and appreciated that a common approach to hacking or maliciously interfering with RFID sensors it to remove its QSPI and replace it with other elements. With the disclosed approach of a QSPI that includes a digitally signed, encrypted boot.bin, it would be extremely challenging for a malicious entity to replace the QSPI with another that would also include a boot.bin file that is digitally verifiable and/or encrypted with the correct RSA key.

The digital verified and properly decrypted boot.bin file can include, but is not limited to:

- a first stage bootloader (FSBL) (e.g., BIOS) for setting up certain CPU cores to execute later-run code,
- a bitstream file for programming the processor 222/FPGA such as, for example, to connect the peripherals as desired and to perform logic in any predetermined portion of the chip/circuit that includes the processor 222, the eFuse 228, the QSPI 226, and/or the like,
- an Arm trusted firmware (ATF) for configuring access controls to prevent later code from accessing dangerous or security critical registers and rams in the processor 222, and
- a primary bootloader (e.g., U-Boot) for loading a kernel of an operating system of the sensor 120 such as, for example, from the memory 224.

In some cases, one or more of the bootloaders described herein can be encrypted with AES with Galois/Counter Mode (AES-GCM). The processor 222 can be further configured to execute the primary bootloader to download, from the controller 110, another binary file (e.g., a third binary file) such as, for example, a FIT (flattened Image Tree) image file that in turn is used for loading the kernel of the sensor 120, though it is understood that other file formats (e.g., raw disk images with gpt (GUID Partition Table) formatting, raw disk images with mbt (Merit Badge Template) formatting, tar files, zip files, and/or the like) can be employed. In some cases, the FIT image is downloaded via trivial file transfer protocol (TFTP), although any suitable network protocol can be employed. Use of TFTP may be advantageous in permitting for larger image files to be downloaded (e.g., 20 MB or more, 30 MB or more, 40 MB or more). Accordingly, in such cases, the controller 110 can be, encompass, and/or execute a TFTP server to permit such communications with the sensor 120. In some cases, the FIT image can be encrypted and/or digitally signed in a manner similar to the boot.bin, such that it should be decrypted and/or digitally verified prior to use. In this manner, it is challenging and extremely unlikely that any malicious FIT image sent to the processor 222 would meet these requirements.

In some cases, the FIT image can include a different boot.bin binary than currently stored in the QSPI 226. The processor 222 can be configured to replace the current boot.bin with the new boot.bin for use the next time that the sensor is booted/rebooted. In some cases, the new boot.bin can already be encrypted and/or signed as described herein. The processor 222 is further configured to, using the FIT image, boot the kernel of its operating system such as, for example, passing a Device Tree Blob (DTB) file that includes hardware information about the sensor 120 from the FIT image to the kernel, passing root file system (e.g., rootfs in Linux) information to the kernel, and/or the like.

In some cases, the controller 110 can store multiple FIT images such as, for example, sensors with different hardware configurations, with different operating systems, and/or the like. In some cases, the controller 110 selects which FIT image to send to a particular sensor 110 in response to the request from U-Boot executing on that sensor. In some cases, since the controller 110 has previously transmitted the U-Boot to that sensor 110, the request from that sensor is for the particular FIT image for that sensor.

Other Security Features

In some cases, communication between the RFID sensor 120 and the controller 110 can generally be initiated by an SSL (Secure Sockets Layer) handshake between them. For example, each sensor 120 can send an authentication request to the controller 110 along with an SSL certificate generated at that sensor 120 by a certificate authority tree deployed on that sensor and associated with a particular certificate authority. The controller 110 also has the same certificate authority trees associated with the same certificate authority, and employs it to generate its own SSL certificate, which is transmitted to that sensor 120 upon receiving the authentication request. Once both the sensor 120 and the controller 110 authenticate each other's certificates, the secure connection is established between them. In some cases, messages over the secure connection are sent via TCP/IP. In some cases, the sensor 120 and the controller 110 are collectively configured to set up the secure communication as a ZeroMQ (zero messaging queue, or ZMQ) pipe, executing a ZMQ protocol between their TCP/IP sockets. Messages sent on this ZMQ pipe can be limited to single-frame/single-part messages having a predetermined size limit. In some cases, the messages can be any suitable serialized representation of structured data/information such as, for example, FlatBuffers (available online at https://google.github.io/flatbuffers/, the entire disclosure of which is incorporated herein by reference), flat binary structs, JSON (JavaScript Object Notation), XML (extensible Markup Language), CSV (Comma Separated Values), and/or the like.

In some cases, the sensor 120 and controller 110 can authenticate each other's certificates without checking for a validity time range. In this manner, given the security features associated with the boot.bin file as disclosed herein, such certificates need not be revoked if found inaccurate, and can stay valid for the lifetime of deployment of the sensor 120 and the controller 110. This in turn reduces the need to rewrite certificates, and obviates the significant developmental effort needed for sending new certificates between the sensors and the controller. In other cases, certificate authentication can include a check for the certificates being within the correct time window. In some cases, the controller 110 can be coupled/couplable to a device/system associated with the certificate authority (e.g., via the Internet), and can authenticate the SSL certificate from the sensor 120 after making a check that the sensor's certificate has not been revoked by the certifying authority. This can be done, for example, by reviewing the sensor's certificate against a certificate signing request (CSR) file for the controller 110 maintained with the device/system of the certifying authority.

Various aspects described here with respect to the sensor devices 110/110 (e.g., storing boot.bin binary on the QSPI 226 as a digitally signed and encrypted file) are easily extensible to other devices of the system 100 that connect to the controller 110/110 such as the camera(s) 130. In some cases, once a secure connection is established by the controller 110 with the sensors 110 and/or the cameras 130, each of these devices can send status information to the controller 110 continuously, periodically, asynchronously, and/or the like. As an example, the sensors 110 can send an update to the controller 140 when changing its position. As another example, the camera 130 can send an update to the controller 140 when it is not in use, i.e., not capturing image/video information for consumption by the controller 140.

In some cases, the sensor 120 further includes a second processor/controller communicably coupled to the controller 110, also sometimes referred to as a watchdog, a timer, a watchdog timer, and variants thereof. During routine operation, the controller 110 executes computer-executable instructions (e.g., stored on the memory 214) that cause the controller 110 to periodically transmit a status/operating signal to the watchdog timer every 10 seconds, 20 seconds 30 seconds, 60 seconds, every 2 minutes or more. If the sensor 120 is malfunctioning for any reason (e.g., operation is paused by a cyber attack), the controller 110 may be unable to transmit the status signal to the watchdog timer. When this occurs, the watchdog timer can be configured to control and reset operation of one or more hardware components (e.g., via a reset pin of the controller 110), which can mitigate the intrusion or render the intrusion ineffective.

Example Method

Figure 3:
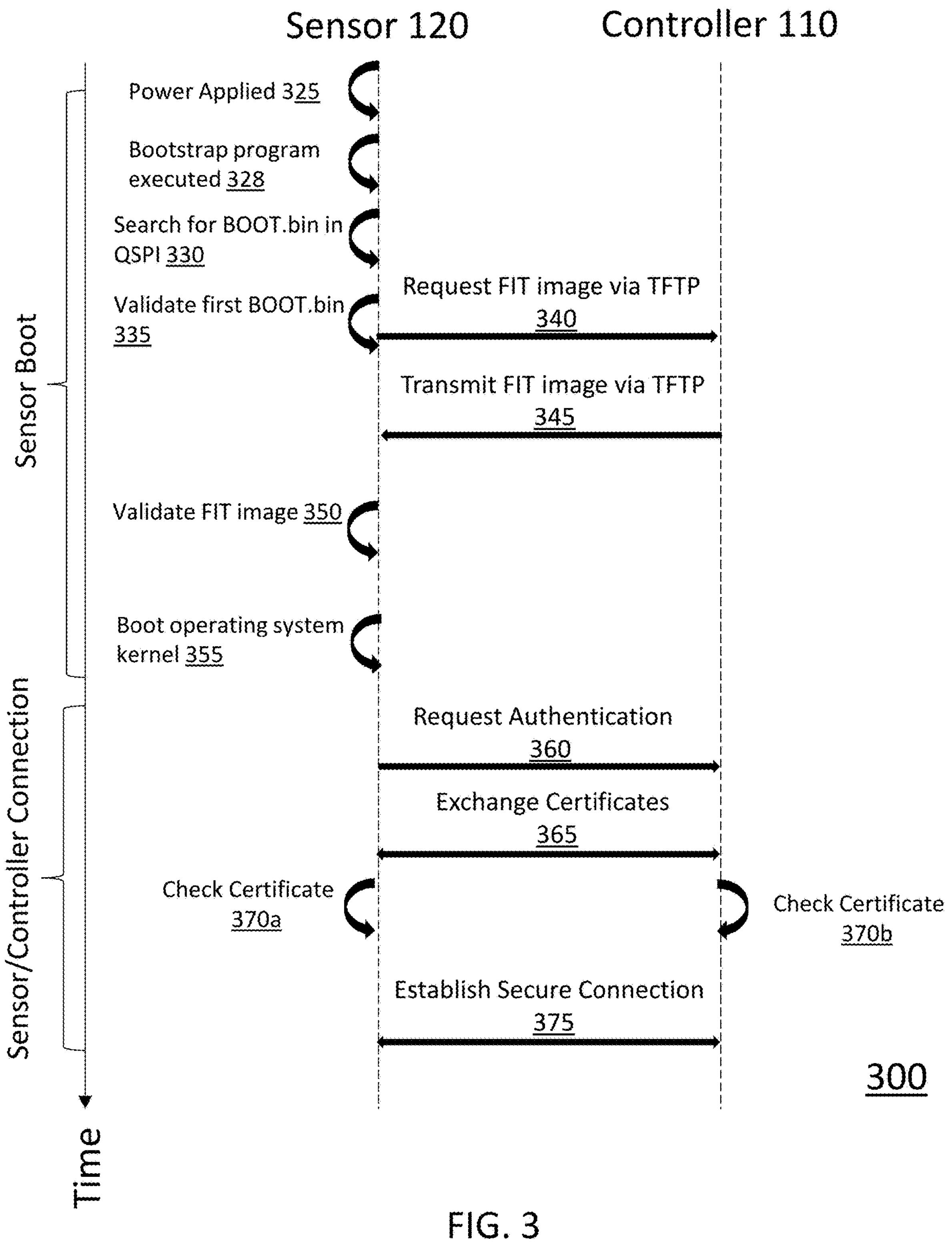
FIG. 3 illustrates an example method of securely booting an RFID sensor with a controller.

FIG. 3 illustrates an example method 300 of securely booting a sensor 120 with a controller 110. Illustrated for simplicity with respect to a single sensor 120 and controller 110, at step 325, power is applied to the sensor 120 via, for example, Power over Ethernet (POE) circuitry (e.g, a POE switch). Upon power up, at step 328, the sensor 110 executes a first binary file (e.g., a bootstrap program). The bootstrap program executed a series of steps that include searching for a second binary (e.g., boot.bin) in the QSPI 226 at step 330. At step 335, the bootstrap program can validate the boot.bin by checking its digital signature (e.g., versus that stored in the eFuse), by decrypting it (e.g., using the AES key stored in the eFuse), and/or the like. Once the boot.bin has been validated, the sensor 120 can execute the boot.bin to request a FIT image from the controller 110 at step 340. The sensor 120 receives the FIT image at step 345 and validates the FIT image at step 350, such as by checking its digital signature, by decrypting it, and/or the like. Once the FIT image has been validated, the sensor 120 can employ the FIT image (e.g., a U-Boot component/partition of the FIT image) to load and execute the kernel of an operating system of the sensor 120.

The sensor 120 can then, at step 360, request authentication by the controller 110 for subsequent communications.

At step 365, the sensor 120 and the controller 110 can (optionally generate, and then) exchange SSL certificates. The sensor 120, controller 110 checks its received certificate at step 370*a*, 370*b* respectively. Once the certificates are authenticated, a secure connection is set up at step 375 such as, for example, a ZMQ pipe between TCP/IP sockets of the sensor 410 and the controller 110, as described above.

Benefits of the inventive systems, devices, and methods disclosed herein can further permit high speed messaging between the sensors and controller while maintaining security, with the controller exchanging from hundreds to thousands of messages per sensor per second with latency as low as 10 ms. When the system encompasses a large number of sensors per controller (e.g., 20-100 sensors/controller), low latency is highly desirable for better control and for making quicker decisions.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of securely booting a radio-frequency identification (RFID) sensor via a controller, the method comprising:

executing a first binary file stored in a memory of the RFID sensor to search for a second binary file stored in a peripheral component of the RFID sensor;

determining whether the second binary file is valid by:

verifying a digital signature of the second binary file based on a first digital key stored on the RFID sensor; and/or decrypting the second binary file based on a second digital key stored on the RFID sensor;

in response to determining that the second binary file is valid, executing a bootloader of the second binary file to request, from the controller, for a third binary file;

receiving, from the controller, the third binary file;

determining whether the third binary file is valid by:

verifying a digital signature of the third binary file; and/or decrypting the third binary file;

in response to determining that the third binary file is valid, executing the third binary file to load a kernel of an operating system of the RFID sensor into the memory of the RFID sensor;

transmitting, from the RFID sensor to the controller, a request to authenticate the RFID sensor for subsequent communications between the RFID sensor and the controller;

transmitting, from the RFID sensor to the controller, a first Secure Sockets Layer (SSL) certificate;

receiving, at the RFID sensor from the controller, a second SSL certificate; and in response to the RFID sensor determining that the first SSL certificate is authentic and the controller determining that the second SSL certificate is authentic, establishing a secure communication channel between the RFID sensor and the controller.

2. The method of claim 1, wherein the first digital key and second digital key are stored on an electronic fuse of the RFID sensor.

3. The method of claim 1, wherein the peripheral component is a quad serial peripheral interface (QSPI).

4. The method of claim 1, wherein the second digital key includes a physical unclonable function (PUF) key.

5. The method of claim 1, wherein the first digital key is an Rivest-Shamir-Adleman (RSA) key and the second digital key is an Advanced Encryption Standard (AES) key.

6. The method of claim 1, wherein the third binary file includes an updated version of the second binary file, and further comprising:

replacing the second binary file stored in the RFID sensor with the updated version of the second binary file.

7. The method of claim 1, wherein the secure communication channel is a ZeroMQ (ZMQ) pipe between Transmission Control Protocol/Internet Protocol (TCP/IP) sockets of the RFID sensor and the controller.

8. A radio-frequency identification (RFID) sensor comprising:

a memory to store a first binary file;

a peripheral component to store a second binary file and to communicate with a controller; and a processor, operably coupled to the memory and to the peripheral component, to execute the first binary file, to search for the second binary file in the course of executing the first binary file, to validate the second binary file, to request a third binary file from the controller in response to successfully validating the second binary file, to validate the third binary file, to execute the third binary file in response to successfully validating the third binary file, and to load an operating system of the RFID sensor into the memory of the RFID sensor in the course of executing the third binary file, wherein the processor is further configured to:

transmit, to the controller, a request to authenticate the RFID sensor for subsequent communications between the RFID sensor and the controller;

transmit, to the controller, a first Secure Sockets Layer (SSL) certificate;

receive, from the controller, a second SSL certificate;

determine that the second SSL certificate is authentic; and in response to determining that the second SSL certificate is authentic and the controller determining that the first SSL certificate is authentic, establish a secure communication channel between the RFID sensor and the controller.

9. The RFID sensor of claim 8, wherein the peripheral component is a quad serial peripheral interface (QSPI).

10. The RFID sensor of claim 8, wherein the processor is configured to validate the second binary file by:

verifying a digital signature of the second binary file based on a first digital key stored on the RFID sensor; and/or decrypting the second binary file based on a second digital key stored on the RFID sensor.

11. The RFID sensor of claim 10, wherein the first digital key is an Rivest-Shamir-Adleman (RSA) key and the second digital key is an Advanced Encryption Standard (AES) key.

12. The RFID sensor of claim 10, wherein the second digital key includes a physical unclonable function (PUF) key.

13. The RFID sensor of claim 10, further comprising:

an electronic fuse, operably coupled to the processor, to store the first digital key and second digital key.

14. The RFID sensor of claim 8, wherein the processor is configured to validate the third binary file by:

verifying a digital signature of the third binary file; and/or decrypting the third binary file.

15. The RFID sensor of claim 8, wherein the third binary file includes an updated version of the second binary file, and wherein the processor is configured to replace the second binary file stored in the peripheral component with the updated version of the second binary file.

16. The RFID sensor of claim 8, wherein the secure communication channel is a ZeroMQ (ZMQ) pipe between Transmission Control Protocol/Internet Protocol (TCP/IP) sockets of the RFID sensor and the controller.

* * * * *